United States Patent [19]

Karabinis

[11] Patent Number: 4,780,884
[45] Date of Patent: Oct. 25, 1988

[54] SUPPRESSED DOUBLE-SIDEBAND COMMUNICATION SYSTEM

[75] Inventor: Peter D. Karabinis, Atkinson, N.H.

[73] Assignee: American Telephone and Telegraph Company, AT&T Bell Laboratories, Murray Hill, N.J.

[21] Appl. No.: 37,071

[22] Filed: Apr. 13, 1987

Related U.S. Application Data

[63] Continuation of Ser. No. 835,265, Mar. 3, 1986, abandoned, which is a continuation-in-part of Ser. No. 741,026, Jun. 3, 1985, abandoned.

[51] Int. Cl.$^4$ .............................................. H04L 23/02
[52] U.S. Cl. ........................................ 375/39; 375/43; 375/61; 370/20
[58] Field of Search .................... 375/39, 43, 50, 77, 375/80, 81, 102, 61; 370/20; 329/112; 455/295, 303

[56] References Cited

U.S. PATENT DOCUMENTS

| | | | |
|---|---|---|---|
| 3,384,824 | 5/1968 | Grenier | 370/20 |
| 3,443,229 | 5/1969 | Becker | 375/39 |
| 3,522,537 | 8/1970 | Boughtwood | 375/39 |
| 3,605,017 | 9/1971 | Chertok | 375/43 |
| 3,825,834 | 7/1974 | Stuart et al. | 375/61 |
| 3,849,730 | 11/1974 | Ho | 375/77 |
| 4,355,397 | 10/1982 | Stuart | 375/39 |
| 4,439,863 | 3/1984 | Bellamy | 375/39 |
| 4,461,011 | 7/1984 | Lender et al. | 375/43 |
| 4,470,145 | 9/1984 | Williams | 375/77 |
| 4,577,330 | 3/1986 | Kavehrad | 375/15 |

Primary Examiner—Robert L. Griffin
Assistant Examiner—Stephen Chin
Attorney, Agent, or Firm—David R. Padnes

[57] ABSTRACT

A bandwidth reduction technique is disclosed for use in digital systems wherein a pair of data signal elements modulate quadrature-related carriers. This modulation, referred to as quadrature amplitude modulation (QAM), phase shift keying (PSK) or amplitude and phase shift keying (APSK), generates a double-sideband signal which is transmitted in a variety of communications systems. In accordance with the present invention, the above-described double-sideband signal is filtered to form either a single sideband or vestigial sideband signal prior to transmission. While this use of a vestigial or single-sideband signal, in lieu of a double-sideband signal, permits the transmission of more information in a given frequency interval, the filtering process contaminates the data signal elements. To recover the data signal elements at the receiver, a pair of received signal elements is formed by extracting the carrier signals. One of these received signal elements is then altered at selected times to recover an associated one of the data signal elements at each selected time. Finally, this associated data signal element at certain ones of the selected times is combined with the other one of the received signal elements at an associated time to form the remaining data signal element.

24 Claims, 3 Drawing Sheets

SUPPRESSED DOUBLE-SIDEBAND COMMUNICATION SYSTEM

CROSS-REFERENCE TO RELATED APPLICATION

This is a continuation of application Ser. No. 835,265 filed 3/3/86, now abandoned which is a continuation in part of application Ser. No. 741,026, filed June 3, 1985 now abandoned.

TECHNICAL FIELD

The present invention relates to a digital communications system which transmits a suppressed double-sideband signal comprising modulated quadrature-related carriers. This suppressed double-sideband signal may be either a single-sideband or a vestigial sideband signal.

BACKGROUND OF THE INVENTION

Digital communication systems utilize a myriad of modulation formats. In one commonly-used format, elements of a data signal modulate quadrature-related carrier signals. This type of modulation has a variety of names, such as phase shift keying (PSK), quadrature amplitude modulation (QAM), and amplitude and phase shift keying (APSK). The information conveyed by the data signal is, of course, virtually limitless and can include voice, video, facsimile and the like. Moreover, the transmission channel carrying the modulated carriers is also not limited and, at present, may include air, wire or lightguide.

A problem in practically all communications systems is that the transmission channel is band-limited. That is, there is a finite frequency interval which can be used to convey information. This limitation arises because of system and/or device requirements. While the severity of this problem does vary from system to system, it still can be said that the ability to convey still more information in a given frequency interval would be highly desirable.

One technique to increase the information-carrying capacity of a digital system transmitting modulated quadrature-related carriers is to increase the number of permissible modulation states. An example of this technique is exemplified by the design and deployment of 64 QAM systems in lieu of 16 QAM systems in applications requiring greater capacity. The problem with this technique is that the change in the number of modulation states requires, at least, the design and development of new modulators and demodulators. This effort is often expensive and the resulting equipment, at times, can not be retrofitted into operational systems without great expense.

Another technique to increase system capacity has been to utilize single-sideband or vestigial sideband signals instead of double-sideband signals. This technique is rather simple to implement and has been routinely used in formats which modulate a single carrier signal. Unfortunately, this technique has not been used for systems utilizing quadrature-related carriers because there was no known way of intelligently decoding the received signal after filtering.

SUMMARY OF THE INVENTION

The present invention is intended for use in digital communications systems wherein elements of a data signal modulate quadrature-related carrier signals to form a double-sideband signal. To reduce the required bandwidth, one of the sidebands of the double-sideband signal is suppressed. This suppression may be complete, in which case a single-sideband signal is created, or partial, so as to form a vestigial sideband signal. After propagation through the transmission channel, the received suppressed double-sideband signal is demodulated into received signal elements. Each of these received signal elements includes an element of the data signal, hereinafter referred to as the associated data signal element, along with a spurious signal introduced by the sideband suppression. In the receiver, the value of one of the received signal elements at selected times is altered to form the associated data signal element at each selected time. This data signal element at certain ones of the selected times is then combined with the other received signal element at a corresponding time to recover the remaining data signal element.

A feature of the present invention is that it can be implemented within existing digital communications systems to provide a substantial increase in information-carrying capacity within some preselected bandwidth.

A further feature of the present invention is that it can be used with conventional demodulation and equalization techniques.

DETAILED DESCRIPTION

Figure 1:
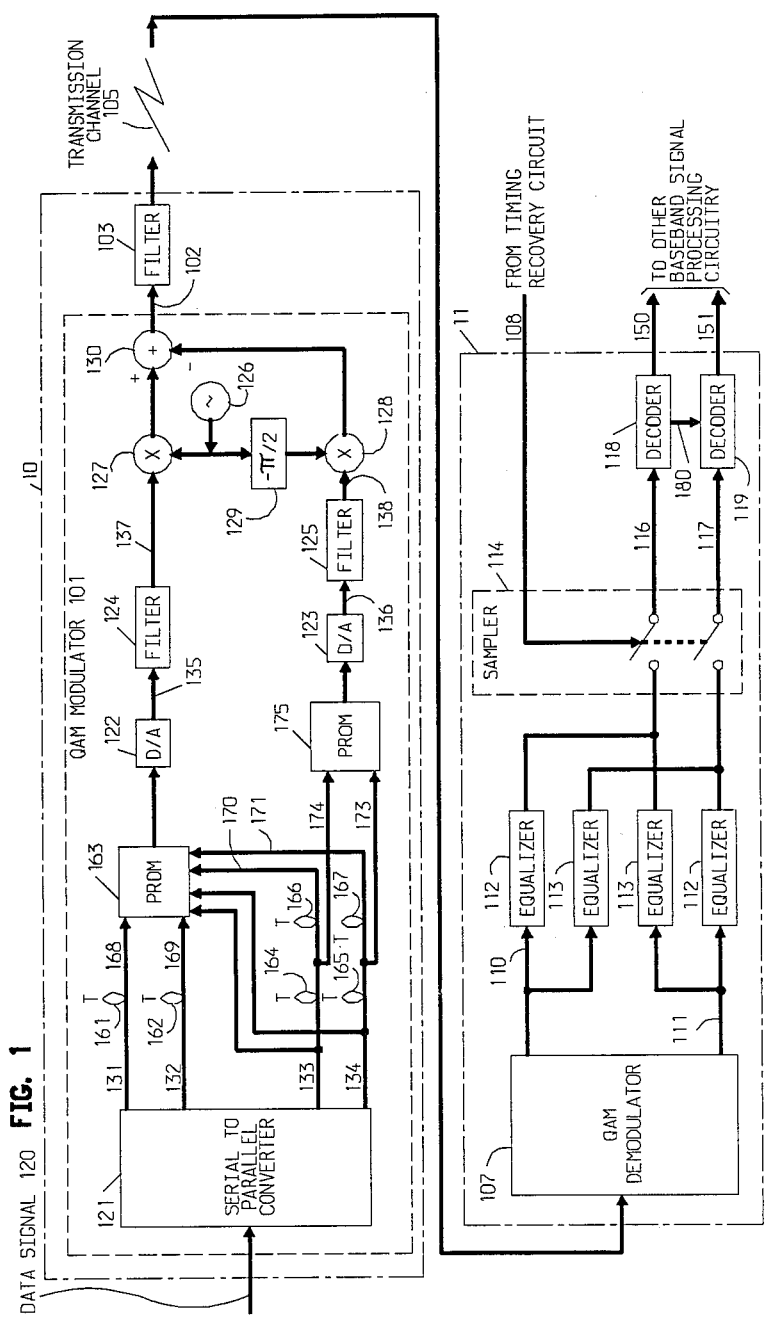
FIG. 1 is a block schematic diagram of a communications system which incorporates the present invention.

FIG. 1 shows an exemplary QAM communications system which incorporates the present invention. At transmitter 10, a digital data signal on lead 120 is coupled to a modified QAM modulator 101. Within modulator 101, serial-to-parallel converter 121 spreads successive bits of the data signal on lead 120 over four paths 131, 132, 133, and 134, respectively.

In a conventional QAM modulator, the bits on leads 131 and 132 would be directly coupled to (D/A) converter 122 while the bits on leads 133 and 134 would be directly coupled to D/A converter 123. Each of these converters quantizes their respective input bits into a number of signal voltages. Now, however, to avoid decoding ambiguity problems which arise with the transmission of a suppressed double-sideband signal, and which will be discussed hereinafter, programmable read only memory (PROM) units 163 and 175 are disposed between serial-to-parallel converter 121 and D/A converters 122 and 123. Each PROM reads out one of a plurality of digital words in response to an address.

PROM 163 is addressed by the bits on leads 168, 169, 133, 134, 170 and 171. These six leads carry the bits outputted by serial-to-parallel converter 121 onto leads 131, 132, 133 and 134 that are in a prescribed temporal relationship relative to one another. Specifically, the bits on leads 131 and 132 are delayed for one baud interval, T, by delay elements 161 and 162 before appearing on leads 168 and 169. Similarly, the bits on leads 133 and 134 are respectively delayed for two baud intervals via delay elements 164, 166 and 165 and 167 before appearing on leads 170 and 171.

For illustrative purposes, we will designate the bits appearing on leads 131 and 132 as the "I" or in-phase data signal element and the bits appearing on leads 133 and 134 as the "Q" or quadrature phase data signal element. I and Q are time-varying functions of time expressible as i(kT) and q(kT), where k is any integer. Normalizing these functions with respect to the bits simultaneously appearing on leads 168, 169, 173 and 174, the bits on leads 168 and 169 can be expressed as i(kT), the bits on leads 170 and 171 as q((k−1)T), and the bits on leads 133 and 134 as q((k+1)T). Viewing the bits simultaneously appearing on leads 168, 169, 173 and 174 as the current state of data signal elements I and Q, PROM 163 is addressed by current state of the I data signal element and the state of the Q data signal element before and after the current state. Similarly, PROM 175 is addressed by the current state of the Q data signal element.

The digital words read out of PROMs 163 and 175 are coupled to D/A converters 122 and 123 where they are converted into analog signal voltages which appear on leads 135 and 136, respectively. Multipliers 127 and 128 receive the signal voltages on leads 135 and 136 after they are respectively smoothed by Nyquist filters 124 and 125. Multiplier 127 modulates the amplitude of a carrier signal generated by oscillator 126 with the signals on lead 135 after filtering. In similar fashion, multiplier 128 modulates the amplitude of a second carrier signal with the signals on lead 136 after smoothing by Nyquist filter 125. The second carrier signal supplied to multiplier 128 is generated by shifting the carrier signal generated by oscillator 126 by minus $\pi/2$ radians via phase shifter 129. Hence, the pair of carrier signals supplied to multipliers 127 and 128 are in phase quadrature to one another and the products provided by multipliers 127 and 128 are each double-sideband signals. Summer 130 then adds the products provided by multipliers 127 and 128 and outputs this sum, also a double-sideband signal onto lead 102.

Reviewing the signal processing provided by the transmitter components discussed thus far, it can be said that these components modulate quadrature-related carriers with elements of a data signal, wherein one element of the data signal comprises the signals appearing on leads 131,132 or 135 or 137 while the other data signal element comprises the signals appearing on leads 133,134 or 136 or 138.

In prior art communications systems, the output of summer 130 is coupled to a transmission channel which propagates the information to system receiver 11. In accordance with the present invention, a filter 103 is also added to the transmitter to suppress one of the sidebands of the double-sideband signal at the output of summer 130 and thereby reduce the bandwidth required for signal transmission. This sideband suppression may be either complete or partial by selecting the filter 103 roll-off factor. For example, for an ideal filter having a roll-off factor of 0, a single-sideband signal is created at the output of filter 103 while for a filter roll-off factor <1 and >0, a vestigial sideband signal appears at the filter output. Accordingly, for complete sideband suppression, a second single-sideband QAM signal may be transmitted in the recovered frequency interval. The resulting capacity of two 16 QAM single-sideband signals is equivalent to that of a 256 QAM double-sideband signal. Or, for partial sideband suppression, QAM signals having a higher symbol rate and, hence, more information per unit time, can be transmitted within the double-sideband signal frequency spectrum. With either partial or complete sideband suppression, however, the operation of conventional QAM receiver circuitry is corrupted and additional functional capability is required in the receiver to intelligently recover the data signal elements. At this juncture, it should be understood that the present invention is also applicable to radio systems wherein additional circuitry is often disposed between summer 130 and the transmission channel to shift the frequency of the transmitted carriers to a higher frequency band. Moreover, the present invention is not limited to QAM systems and, indeed, may be utilized in any system which transmits a signal comprising modulated quadrature-related carriers which are modulated in phase or amplitude or some combination of phase and amplitude.

To understand the principles of the present invention, it is first necessary to consider the effects of filtering one of the sidebands of the illustrative double-sideband QAM signal and then transmitting the resulting suppressed double-sideband signal through a transmission channel.

The QAM signal appearing at the output of summer 130 can be expressed as a function of the time s(t) with $$s(t) = i(t) \cos w_c t - q(t) \sin w_c t; \quad (1)$$

and where $w_c$ denotes the frequency of the carrier generated by oscillator 126, and i(t) and q(t) respectively denote the values of the I and Q data signal elements as a function of time.

When s(t) is passed through filter 103 with an impulse response h(t) in order to completely or partially suppress either one of the sidebands, we can express the resulting suppressed sideband signal as $[s(t)]_{SSB}$ with $$[s(t)]_{SSB} = \int_{-\infty}^{\infty} h(\tau) i(t - \tau) \cos[w_c(t - \tau)] d\tau \quad (2)$$

$$- \int_{-\infty}^{\infty} h(\tau) q(t - \tau) \sin[w_c(t - \tau)] d\tau$$

and where $\tau$ represents a dummy variable of integration. Using the trigonometric identities:

$$\cos[w_c(t-\tau)] = \cos w_c t \cos w_c \tau + \sin w_c t \sin w_c \tau$$

and $$\sin[w_c(t-\tau)] = \sin w_c t \cos w_c \tau - \cos w_c t \sin w_c \tau, \quad (3)$$

equation (2) can be rewritten as:

$$[s(t)]_{SSB} = \int_{-\infty}^{\infty} \{h(\tau)i(t-\tau)\cos w_c\tau d\tau\}\cos w_c t \quad (4)$$
$$+ \int_{-\infty}^{\infty} \{h(\tau)q(t-\tau)\sin w_c\tau d\tau\}\cos w_c t$$
$$+ \int_{-\infty}^{\infty} \{h(\tau)i(t-\tau)\sin w_c\tau d\tau\}\sin w_c t$$
$$- \int_{-\infty}^{\infty} \{h(\tau)q(t-\tau)\cos w_c\tau d\tau\}\sin w_c t.$$

Equation (4), in turn, can be written as:

$$[s(t)]_{SSB} = \tfrac{1}{2}\{i(t) + \hat{q}(t)\}\cos w_c t \quad (5)$$
$$- \tfrac{1}{2}\{q(t) - \hat{i}(t)\}\sin w_c t,$$

where $\hat{i}(t)$ and $\hat{q}(t)$ are functions of $i(t)$ and $q(t)$, respectively. For the case of filter 103 being an ideal low-pass or high-pass filter with cut-off frequency $w_c$, $\hat{i}(t)$ and $\hat{q}(t)$, respectively, are the Hilbert transforms of $i(t)$ and $q(t)$.

A comparison of equation (5) with equation (1) reveals that the effect of suppressing one of the sidebands of the QAM signal of equation (1) contaminates $i(t)$ with a function of $q(t)$ and contaminates $q(t)$ with a function of $i(t)$. Consequently, the receiver of FIG. 1 must be provided with the capability of eliminating $\hat{q}(t)$ and $\hat{i}(t)$ to respectively recover the $i(t)$ and $q(t)$ components.

Refer back to FIG. 1 and consider the general case where transmission channel 105 is dispersive and introduces distortion comprising intersymbol interference (ISI), cross-rail interference (X-rail ISI) and Gaussian noise (n(t)). If $[s(t)]_{SSB}$ is coupled through a conventional QAM demodulator 107, two received data elements $i'(t)$ and $q'(t)$ are formed on leads 110 and 111. The generation of $i'(t)$ and $q'(t)$ is accomplished by extracting the quadrature-related carriers from the received signal using well-known carrier recovery techniques. The signals on leads 110 and 111 can be expressed as:

$$i'(t) = [i(t) + \hat{q}(t)] + ISI + X\text{-rail } ISI + n_I(t), \quad (6)$$

and $$q'(t) = [q(t) - \hat{i}(t)] + ISI + X\text{-rail } ISI + n_Q(t), \quad (7)$$

with $n_I(t)$ and $n_Q(t)$ respectively representing the Gaussian noise introduced into $i(t)$ and $q(t)$.

The ISI and X-rail ISI in equations (6) and (7) can be eliminated by coupling $i'(t)$ and $q'(t)$ through conventional transversal equalizers 112 and 113 which are configured to operate on $i'(t)$ and $q'(t)$ as if $[i(t)+\hat{q}(t)]$ and $[q(t)-\hat{i}(t)]$ were the information signals. Advantageously, the tap-weight coefficients of equalizers 112 and 113 are adjusted to track the distortion in the transmission channel via well-known circuitry not shown. The equalized signals $i_E(t)$ and $Q_E(t)$ appearing at the output of equalizers 112 and 113 are then sampled at the baud rate, $1/T$, by sampler 114. The $k^{th}$ sample, where k is any integer, can be expressed as $$i_E(kT) = [i(kT) + \hat{q}(kT)] + n_{IE}(kT) \quad (8)$$

for lead 116 and $$q_E(kT) = [q(kT) - \hat{i}(kT)] + n_{QE}(kT) \quad (9)$$

for lead 117. The expressions $n_{IE}(kT)$ and $n_{QE}(kT)$ represent the Gaussian noise in the received signal components after equalization at the $k^{th}$ sampling time. Sampler 114 is controlled by a timing signal on lead 108 which is supplied by conventional timing recovery circuitry (not shown) in the receiver.

To recover the information carrying components of $i(kT)$ and $q(kT)$, $\hat{q}(kT)$ and $\hat{i}(kT)$ must be eliminated. It can be shown that $\hat{q}(kT)$ and $\hat{i}(kT)$ can only assume a limited number of values and the values are a function of the quantized values provided by D/A converters 122 and 123. The set of values for $\hat{i}(kT)$ and $\hat{q}(kT)$ for any communications system utilizing Nyquist filtering and filter 103 can be expressed as $$\hat{i}(kT) = a_{-N}i((k-N)T) + \ldots \quad (10)$$
$$+ a_{-1}i((k-1)T) + a_1 i((k+1)T) + \ldots$$
$$+ a_N i((k+N)T)$$

and $$\hat{q}(kt) = a_{-N}q((k-N)T) + \ldots \quad (11)$$
$$+ a_{-1}q((k-1)T) + a_1 q((k+1)T) + \ldots$$
$$+ a_N q((k+N)T).$$

where
N is a large predetermined integer, $i((k-N)T) \ldots i((k-1)T)$ and $q((k-N)T) \ldots q((k-1)T)$, respectively, denote the value of $i(t)$ and $q(t)$ at N through 1 sampling times prior to the present sampling times, $i((k+1)T) \ldots i((k+N)T)$ and $q((k+1)T) \ldots q((k+N)T)$, respectively, denote the value of $i(t)$ and $q(t)$ at 1 through N sampling times after the present sampling time, and $a_{-N} \ldots a_N$ are constants associated with each sampling time which can be determined from an analysis of the $\hat{i}(t)$ and $\hat{q}(t)$ waveforms.

That is, $\hat{i}(kt)$ and $\hat{q}(kt)$ are each a weighted combination of $i(t)$ and $q(t)$, respectively, at a large number of sampling times preceding and succeeding the current sampling time. For the case of filter 103 having a roll-off factor of 0.5 which transforms the double-sideband QAM signal into a particular vestigial sideband signal, equations (10) and (11) are reduced to:

$$\hat{i}(kT) = -\tfrac{1}{2}i((k-1)T) \quad (12)$$
$$+ \tfrac{1}{2}i((k+1)T)$$

and $$\hat{q}(kT) = -\tfrac{1}{2}q((k-1)T) \quad (13)$$
$$+ \tfrac{1}{2}q((k+1)T).$$

That is, $\hat{i}(t)$ at the $k^{th}$ sampling time is a function of $i(t)$ at the $(k-1)$ and $(k+1)$ sampling times wherein the $(k-1)$ and $(k+1)$ sampling times are one sampling time immediately preceding and one sampling time immediately succeeding the $k^{th}$ sampling time, respectively. And $\hat{q}(t)$ at the $k^{th}$ sampling time is a function of $q(t)$ at the $(k-1)$ and $(k+1)$ sampling times wherein the $(k-1)$ and (k+1) sampling times are, respectively, only sampling time immediately preceding and one sampling time immediately succeeding the $k^{th}$ sampling time.

For purposes of simplicity, it will be assumed, for the remaining discussion, that filter 103 in FIG. 1 has a roll-off factor of 0.5.

From equations (12) and (13), it follows that in the illustrative 16 QAM communication system wherein i(t) and q(t) each can take on the values of $\pm 1$ and $\pm 3$ volts, $\hat{i}(kT)$ and $\hat{q}(kT)$ can take on any value from the set $\{0, -1, -2, -3, 1, 2, 3\}$. Therefore, at any sampling instant, kT, $\hat{i}(kT)$ and $\hat{q}(kT)$ can assume one of seven possible values.

Figure 3:
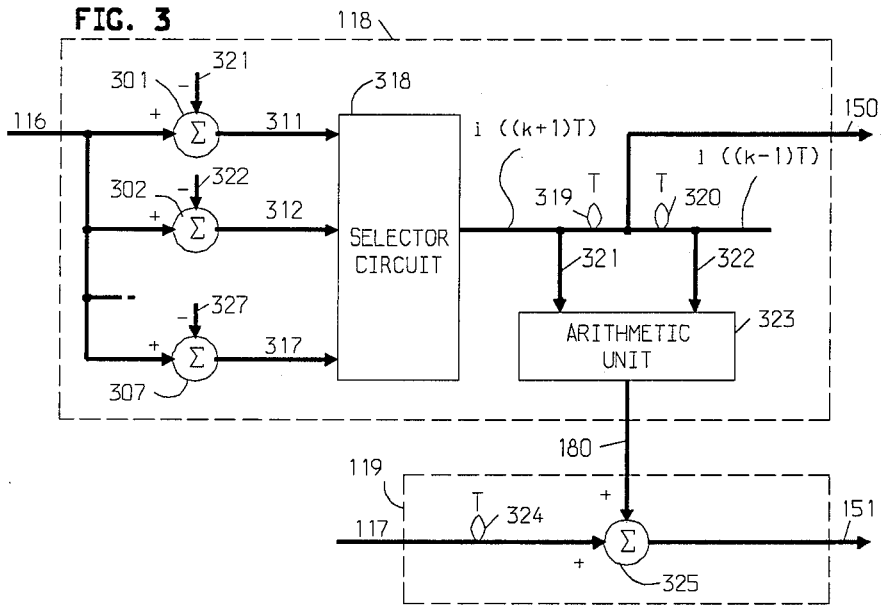
FIG. 3 is a detailed schematic diagram of one embodiment of decoders 118 and 119 shown in the communications system of FIG. 1.

Refer now to FIG. 3 which shows a detailed schematic of the circuitry within decoders 118 and 119 of FIG. 1. In decoder 118, the $k^{th}$ sample $i_E(kT)$ is supplied to seven summers 301, 302, ... 307 to form seven estimates of i(kT) on leads 311 through 317. Each summer forms one of these estimates by subtracting a different one of the seven possible values of $\hat{q}(t)$ from $i_E(kT)$. Each of leads 321-327 supplies a different value of $\hat{q}(t)$ from a source of reference voltages (not shown). Selection circuit 318, comprising multiple threshold detectors, compares each estimate against the permissible values of i(kT), namely, $\pm 1$ and $\pm 3$ volts, and selects the estimate of i(kT) which is closest to any of the permissible values. This selected estimate is outputted on lead 150 after being delayed for one baud interval via delay element 319.

In the process of estimate formation and selection, it is possible for ambiguities to arise, i.e., there are two or more estimates formed which are equally close to different permissible data element values. This problem can be substantially mitigated by using one set of values for i(kT) and a different set of values for q(kT).

Figure 2:
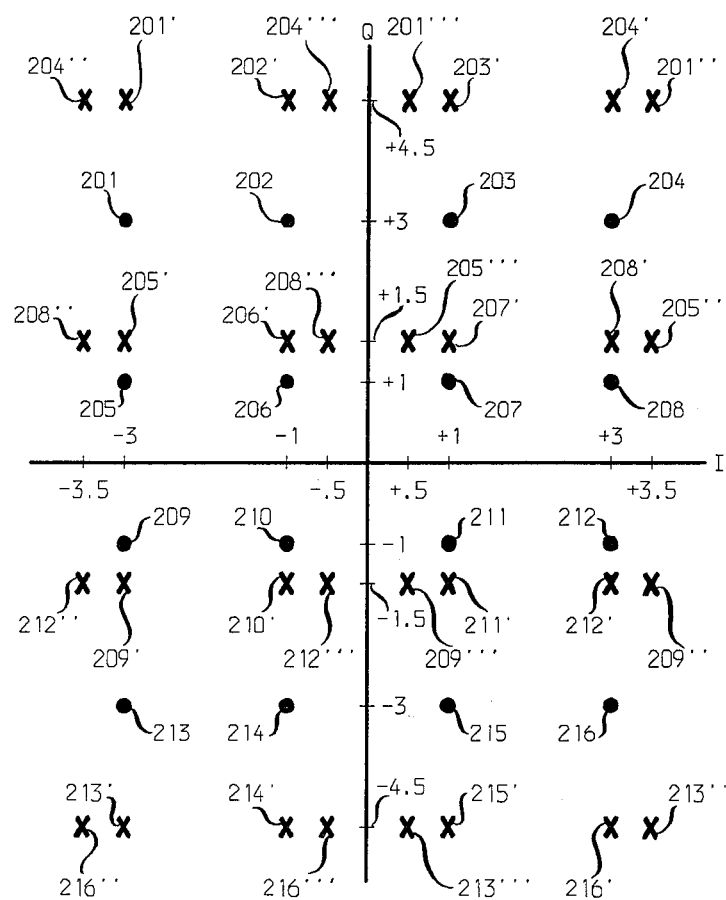
FIG. 2 is a plot of the signal space diagram of the signal levels transmitted by the communications system of FIG. 1.

Refer now to FIG. 2 which is a signal space diagram for the illustrative 16 QAM communications system. This diagram graphically depicts, on a cartesian coordinate plot, all of the possible combinations of transmitted carrier signal amplitudes which represent the data. Assume, for example, that in the illustrative QAM system, the I data signal element on lead 137 and the Q data signal element on lead 138 each can have the value of $\pm 1$ and $\pm 3$ volts. All possible combinations of these permissible values form 16 signal states, designated as 201 through 216. Now, to mitigate the problem of ambiguity, I can take on the values of $\pm 1$ and $\pm 3$ volts while Q has the permissible values of 1.5 and $\pm 4.5$ volts. The 16 remaining signal states are designated as 201' through 216'.

While the use of different permissible values for I and Q substamtially reduces the problem of ambiguity, total elimination requires the modification of the values of one data signal element as a function of prior and succeeding values of the other data signal element. For example, for the illustrative QAM communications system of FIG. 1 wherein filter 103 has a roll-off factor of 0.5, ambiguities will arise when i(kT) is $\pm 3$ and q((k-1)T) and q((k+1)T) have specific values. To eliminate ambiguities, a value of i(kT) of +3 volts for all values of q(kT), is changed to $-3.5$ volts when q((k-1)T) is 4.5 and q((k+1)T) is $-1.5$ volts or when q((k-1)T) is 1.5 volts and q((k+1)T) is $-4.5$ volts. These changes are shown by a displacement of signal states 204', 208', 212' and 216', respectively, to 204", 208", 212" and 216" for the specified values of q((k-1)T) and q((k+1)T). In addition, an i(kT) value of +3 volts, for all values of q(kT), is changed to $-0.5$ volts when q((k-1)T) is +4.5 volts and q((k+1)T) is $-4.5$ volts. This transformation is reflected by the displacement of signal states 204', 208', 212' and 216', respectively, to 204''', 208''', 212''' and 216''' for the specified values of q((k-1)T) and q((k+1)T). In similar fashion, a value of i(kT) of $-3$ volts, for all values of q(kT), is changed to +3.5 volts when q((k-1)T) is $-1.5$ volts and q((k+1)T) is +4.5 volts or when q((k-1)T) is $-4.5$ volts and q((k+1)T) is +1.5 volts. These changes are depicted by the displacement of signal states 201', 205', 209' and 213', respectively, to 201", 205", 209" and 213". Finally, a value of i(kT) of $-3$ volts, for any q(kT) is changed to +0.5 volts when q((k-1)T) is $-4.5$ volts and q((k+1)T) is +4.5 volts. These modifications are shown by the movement of signal states 201', 205', 209' and 213', respectively, to 201''', 205''', 209''' and 213'''. It should be noted that the above-described transformation of the i(kT) signal states for certain values of q((k-1)T) and q((k+1)T) in no way affects the independence of the information carried by each of the data signal elements.

The above-described transformation of the permissible values of i(kT) upon the occurrence of specified values of q(kT) one baud interval before and after i(kT) is provided by PROM 163 in FIG. 1. As discussed hereinabove, PROM 163 is addressed by i(kT), q((k-1)T) and q((k+1)T). Since the change in the permissible values of i(kT) with selected values of q((k-1)T) and q((k+1)T) eliminates decoding ambiguities, an additional change in the permissible values of q(kT) with selected values of i((k-1)T) and i((k+1)T) is not required. Such a change in the permissible values of q(kT) could, of course, be used in lieu of the disclosed changes in the permissible values of i(kT). PROM 175 in FIG. 1 is only used to provide D/A converter 123 with digital data having the same precision as that provided to D/A converter 122.

Data signal element q(kT) is decoded by adding the value of $\hat{i}(kT)$ expressed by equation (12) to the equalized value of q(kT), designated by $q_E(kT)$, which appears on lead 117. Normalizing the output of selector circuit 318 with respect to lead 150, arithmetic unit 323 receives i((k-1)T) and i((k+1)T) via leads 322 and 321, respectively, since delay elements 319 and 320 each provides a delay T of one baud interval. Arithmetic unit 323 provides the value of $\hat{i}(kT)$ in accordance with equation (12) and couples this signal on lead 180 to summer 325 within decoder 119. Summer 325 adds the value of $\hat{i}(kT)$ to the value of $q_E(kT)$ on lead 117. To insure proper synchronization of the value of $\hat{i}(kT)$ to $q_E(kT)$, the latter is delayed by one baud interval by delay element 324 before being supplied to summer 325. The summed signals on lead 327 provided by summer 325 are equal to q(kT) plus Gaussian noise. This signal can be decoded into the data signals on leads 133 and 134 of FIG. 1 using a conventional QAM decoder (not shown) which is connected to lead 151. Similarly, the signal on lead 150 can be decoded into the data signals on leads 131 and 132 using a similar QAM decoder connected to lead 150.

In the embodiment of decoder 118 shown in FIG. 3, parallel signal processing is employed to simultaneously provide seven possible estimates of i(kT). The decoder could, of course, comprise only one adder which sequentially forms seven estimates of i(kT). In this serial signal processing approach, selection circuit 318 would compare each estimate against the permissible values of a data element and would then output any estimate which falls within a predetermined interval surrounding any one of the permissible data element values. Upon outputting an estimate, selector circuit 318 would inhibit the outputting of any other estimate until the next sample is received from sampler 114.

Figure 4:
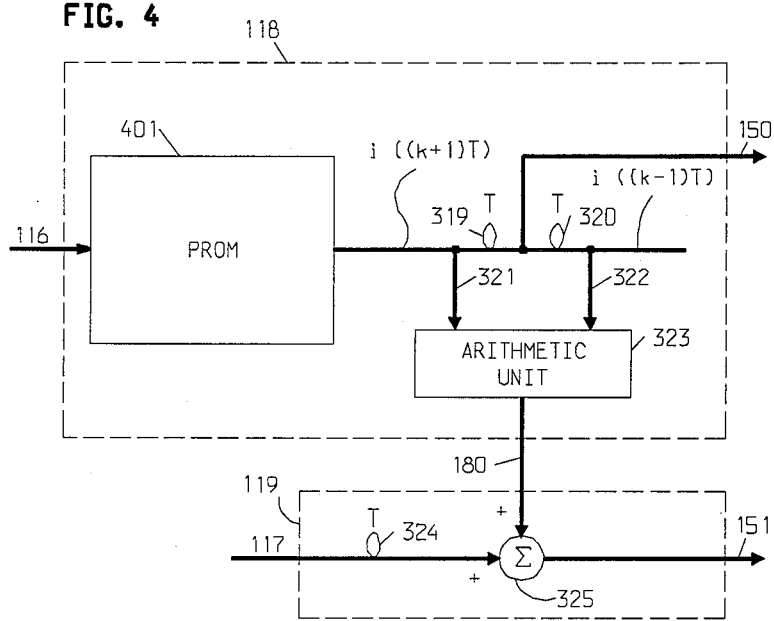
FIG. 4 is a detailed schematic diagram of the preferred embodiment of decoders 118 and 119 shown in the communications system of FIG. 1.

Refer now to FIG. 4 which shows the preferred embodiment of decoders 118 and 1119. For this embodiment, it will be assumed that sampler 114 includes an A/D converter which quantizes the sampled signal into one of a plurality of signal levels. As shown, the $k^{th}$ sample, $i_E(kT)$, is coupled to PROM 401. With the encoding provided by PROM 163 of FIG. 1, the interfering entity, i.e., $\hat{i}(kT)$ or $\hat{q}(kT)$, can be eliminated in response to the value of $i_E(kT)$. Accordingly, PROM 401 reads out the value of $i(kT)$ in response to each $i_E(kT)$ address. Decoder 119 and the balance of decoder 118 in FIG. 4 operate in an identical manner to that described in reference to FIG. 3.

It should, of course, be understood that the present invention is not limited to the particular embodiment disclosed and that numerous modifications will occur to those skilled in the art which are within the spirit and scope of the invention. First, for example, the use of transversal equalizers in the receiver is not required if the magnitude of ISI and X-rail ISI is not large relative to the difference between permissible data element values. This is often true in lightwave and wire systems wherein the transfer function of the transmission channel is not time-varying. Second, while Nyquist filters are only shown in transmitter 10, half-Nyquist filters could also be utilized in transmitter 10 and receiver 11. Finally, while in the disclosed embodiment of the receiver a transmitter filter with a roll-off factor of 0.5 was assumed, it should be understood that the present invention is applicable with a filter 103 having any roll-off factor $\geq 0$ and $<1$. Therefore, the signal transmitted is either a single-sideband or one of a variety of vestigial sideband signals. Use of a filter roll-off factor other than 0.5 requires the formation of estimates of $i(kT)$ and $q(kT)$ in accordance with equations (10) and (11) using a larger PROM or using all possible values of $i(t)$ and $q(t)$ at the 2N different sampling times. These estimates, as with the disclosed embodiment, can be simultaneously or sequentially formed.

What is claimed is:

1. Receiver apparatus for use in a digital transmission system wherein a pair of data signal elements modulate quadrature-related carriers, and wherein the modulated carriers are transformed into a signal having one sideband and another suppressed sideband, said receiver apparatus comprising
   means for demodulating said transformed carriers to form a pair of received signal elements by extracting said quadrature-related carriers, each of said received signal elements comprising an associated one of said data signal elements and an interfering signal caused by the transformation of said carriers;
   means for altering one of said received signal elements at selected times to form said associated data signal element at each of said selected times; and
   means for combining said associated data signal element formed by said altering means at a plurality of said selected times and the other one of said received signal elements at an associated time to form the other one of said data signal elements at said associated time.

2. The apparatus of claim 1 wherein said associated time is one of said selected times.

3. The apparatus of claim 2 wherein said said plurality of selected times precede and succeed said associated time.

4. The apparatus of claim 2 wherein said said plurality of selected times are one selected time preceding and one selected time succeeding said associated time.

5. The apparatus of claim 1 wherein said altering means alters one received signal element at each selected time by a preselected quantity which varies with said received signal element.

6. The apparatus of claim 5 wherein said data signal elements have assigned values and the assigned values for one data signal element are different from the assigned values for the other data signal element.

7. The apparatus of claim 6 wherein said preselected quantity is a function of the assigned values.

8. The apparatus of claim 1 wherein said interfering signal is a nonzero function of an unassociated one of said data signal elements.

9. The apparatus of claim 8 wherein said nonzero function is the Hilbert transform.

10. The apparatus of claim 6 wherein said preselected quantity lies in a set of numbers found by taking an algebraic combination of all possible permutations of said assigned values of one of said data signal elements.

11. The apparatus of claim 1 wherein the transformed carriers are a single-sideband signal.

12. The apparatus of claim 1 wherein said transformed carriers are a vestigial sideband signal.

13. The apparatus of claim 1 wherein the alteration of said one received signal eluent at any one of said selected times is independent of the alterations of said one received signal element at other selected times.

14. A method of retrieving a pair of data signal elements wherein said elements modulate quadrature-related carriers, and wherein the modulated carriers are then transformed into a signal having one sideband and another suppressed sideband, said method comprising the steps of
   demodulating said transformed carriers to form received signal elements by extracting said quadrature-related carriers, each of said received signal elements comprising an associated one of said data signal elements and an interfering signal created by the transformation of said carriers;
   altering one of said received signal elements at selected times to form said associated data signal element at each of said selected times; and
   combining said associated data signal element formed by said altering means at a plurality of said selected times and the other one of said received signal elements at an associated time to form the other one of said data signal elements at said associated time.

15. The method of claim 14 wherein said transformed carriers form a vestigial sideband signal.

16. The method of claim 14 wherein said transformed carriers form a single-sideband signal.

17. The method of claim 14 wherein the alteration of said one received signal element at any one of said selected times is independent of the alterations of said one received signal element at other selected times.

18. A transmitter for use in communications systems comprising
   means for altering a selected element of a data signal at a prescribed time in response to another element of said data signal at other prescribed times, said selected and said another element each representing information which is independent of the other, means responsive to said altering means for modulating quadrature-related carrier signals with said altered element and said another element to form a double-sideband signal, and means responsive to said modulating means for transforming said double-sideband signal into a signal having a sideband and another suppressed sideband.

19. The transmitter of claim 18 wherein said transforming means transforms said double-sideband signal into a vestigial sideband signal.

20. The transmitter of claim 18 wherein said transforming means transforms said double-sideband signal into a single-sideband signal.

21. A communications system comprising a transmitter and a receiver wherein said transmitter comprises means for modulating quadrature-related carrier signals with a pair of data signal elements to form a double-sideband signal, and means for transforming said double-sideband signal into a signal having a sideband and another suppressed sideband, and said receiver comprising means for demodulating said transformed double-sideband signal to form a pair of received signal elements by extracting said quadrature-related carriers, each of said received signal elements comprising an associated one of said data signal elements and an interfering signal created by the transformation of said double-sideband signal, means for altering one of said received signal elements at selected times to form said associated data signal element at each of said selected times; and means for combining said associated data signal element formed by said altering means at a plurality of said selected times and the other one of said received signal elements at an associated time to form the other one of said data signal elements at said associated time.

22. The system of claim 21 wherein the alteration of said one received signal element at any one of said selected times is independent of the alterations of said one received signal element at other selected times.

23. The system of claim 21 wherein said transforming means transforms said double-sideband signal into a single sideband signal.

24. The system of claim 21 wherein said transforming means transforms said double-sideband signal into a vestigial sideband signal.

* * * * *